United States Patent [19]
Kilmartin et al.

[11] Patent Number: 5,889,215
[45] Date of Patent: Mar. 30, 1999

[54] MAGNETOELASTIC TORQUE SENSOR WITH SHIELDING FLUX GUIDE

[75] Inventors: Brian David Kilmartin; Jon William Bossoli, both of Cheshire, Conn.

[73] Assignee: Philips Electronics North America Corporation, New York, N.Y.

[21] Appl. No.: 768,739

[22] Filed: Dec. 4, 1996

[51] Int. Cl.$^6$ ...................................................... G01L 3/10
[52] U.S. Cl. ............................... 73/862.335; 73/862.333
[58] Field of Search ....................... 73/862.333, 862.334, 73/862.335, 862.331, 862.325, 862.321

[56] References Cited

U.S. PATENT DOCUMENTS

| | | |
|---|---|---|
| 5,386,733 | 2/1995 | Hesthamar et al. . |
| 5,465,627 | 11/1995 | Garshelis . |
| 5,520,059 | 5/1996 | Garshelis . |

OTHER PUBLICATIONS

Lacheisserie, "Magnetostriction Theory and Applications of Magnetoelasticity", pp. 366–367, 393–395.
I. Sasada et al, "Torque Transducers With Stress–Sensitive Amorphous Ribbons of Chevron–Pattern", IEEE Trans. on Magnetics, vol. MAG–20, No. 5, Sep. 1984, pp. 951–953.
I. Sasada et al, "Noncontact Torque Sensors Using Magnetic Heads and a Magnetostrictive Layer on the Shaft Surface— Application of Plasma Jet Spraying Process", IEEE Trans. on Magnetics, vol. MAG–22, No. 5, Sep. 1986, pp. 406–408.
I.J. Garshelis et al, "A Torque Transducer Utilizing Two Oppositely Polarized Rings", Apr. 4, 1994.
I.J. Garshielis et al, "A Magnetoelastic Torque Transducer Utilizing A Ring Divided Into Two Oppositely Polarized Circumferential Regions", MMM 1995, Paper No. BB–08; pp. 1–9.
I.J. Garshelis, "A Torque Transducer Utilizing A circularly Polarized Ring", IEEE Trans. on Magnetics, vol. 28, No. 5, Sep. 1992, pp. 2202–2204.
I.J. Garshelis et al, Development of a Non–contact Torque Transducer for Electric Power Steering Systems, SAE Tech. Paper Series, Sensors and Actuators 1992, pp. 173–182.
I.J. Garshelis et al, "Investigations of Parameters Affecting the Performance of Polarized Ring", IEEE Transactions on Magnetics, vol. 29, No. 6, Nov. 1993, pp. 3201–3203.

*Primary Examiner*—Ronald L. Biegel
*Attorney, Agent, or Firm*—Robert J. Kraus

[57] ABSTRACT

A magnetoelastic layer is provided on a shaft for sensing torque carried by the shaft around a longitudinal axis. The layer includes first and second adjacent annular parts of a magnetically anisotropic material with circumferential easy axes. The parts are magnetically polarized in opposite circumferential directions when in a quiescent state, but produce helical magnetic fields with respective axial components when torque is carried by the shaft. First and second magnetic-field-guiding structures combine to provide shielding of the magnetoelastic layer from ambient external magnetic fields and to maximize coupling of the axial components from the magnetoelastic layer to one or more magnetic field detectors.

9 Claims, 2 Drawing Sheets

MAGNETOELASTIC TORQUE SENSOR WITH SHIELDING FLUX GUIDE

BACKGROUND OF THE INVENTION

1. Field of the Invention

The invention relates to torque sensing apparatus and, in particular, to an apparatus for sensing torsional stress of a torque-carrying member.

2. Description of Related Art

There are many applications where it is desirable to sense the torsional stress of a torque-carrying member without contacting the member. One type of apparatus for doing this includes a magnetoelastic material, which is intimately bonded to the torque-carrying member, and one or more magnetic field detectors, disposed proximate the magnetoelastic material, for sensing changes in a predefined magnetic field that passes through the material. These changes are indicative of torsional stresses within the torque-carrying member.

Many versions of this type of magnetoelastic torque sensor have been proposed. To the knowledge of applicants, however, none has been widely adopted. Purported failings of such prior art magnetoelastic torque sensors are pointed out in U.S. Pat. No. 5,520,059, which is hereby incorporated by reference. This patent proposes a torque sensor that utilizes one or more circumferentially-polarized rings of magnetostrictive material, which are attached to a torque carrying member, to produce respective magnetic fields with directions that vary as a function of the torque being carried by the member. This torque is measured indirectly, by utilizing magnetic field sensor means for detecting the variable magnetic field produced by the one or more rings.

It is noted in the patent that, in practical usages, a torque sensor is exposed to ambient fields which can compromise single ring embodiments. Thus, single ring embodiments often require the use of either shielding structures, which increase size, or active compensation methods, which can significantly increase complexity. Alternatively, multiple, oppositely-polarized rings are recommended to compensate for adverse affects on measurement accuracy, if the torque sensor is to be exposed to axially-directed ambient fields. The torque sensor accuracy is described as relatively insensitive to radially- directed ambient fields.

Unfortunately, in certain practical applications a magnetoelastic torque sensor is exposed to ambient magnetic fields which are substantially stronger than the fields produced by the rings of magnetostrictive material. One common application is in automotive vehicles where a torque sensors can be used to measure torsional stress in engine shafts or steering members. Strong ambient electromagnetic fields of the types produced by electrical components of the automotive vehicles themselves and by sources in the vicinity of a vehicle, such as electrical power sources associated with railroad lines, have been found to adversely affect even multiple-ring embodiments of the torque sensor disclosed in U.S. Pat. No. 5,520,059, if left unshielded. It has also been found that, even when shielding is used, none of the magnetic field sensor arrangements disclosed in the patent produce electrical signals having sufficiently large signal-to-noise ratios for effectively measuring torque in many common environments. This is particularly true in electromagnetically-noisy environments that are commonly experienced in automotive and industrial applications.

SUMMARY OF THE INVENTION

It is an object of the invention to provide a shielded magnetoelastic torque sensor which is sufficiently compact for use in applications where space is at a premium, such as in automotive applications.

It is another object of the invention to provide a magnetoelastic torque sensor which produces an electrical signal that has a sufficiently large signal-to-noise ratio to facilitate effective torque measurement, even in electromagnetically-noisy environments.

In accordance with the invention, a torque-sensing apparatus for indicating torsional stress about a longitudinal axis of a torque-carrying member comprises magnetic-field-producing means, first and second magnetic-field-guiding means, and magnetic-field-detecting means. These components are configured and arranged so as to both shield the magnetoelastic means and maximize magnetic signal pickup by the detecting means from the magnetoelastic means. These combined effects enable the overall size of the apparatus to be kept relatively small.

The magnetic-field-producing means includes first and second magnetoelastic parts which are intimately bonded to respective portions of the torque-carrying member. Each of the first and second magnetoelastic parts extend circumferentially around the axis from a respective proximate boundary, that is closer to the other magnetoelastic part, to a respective remote boundary, that is farther from the other magnetoelastic part. The magnetoelastic parts are magnetically polarized in opposite first and second circumferential directions. However, when the torque-carrying member experiences torsional stress, they produce oppositely-directed axial magnetic field components representing the direction and magnitude of the torsional stress.

The first magnetic-field-guiding means comprises a magnetically-permeable housing which extends circumferentially around the magnetic-field-producing means from a first portion of the housing, that is closely magnetically coupled to the first magnetoelastic part at said part's remote boundary, to a second portion of the housing, that is closely magnetically coupled to the second magnetoelastic part at said part's remote boundary.

The second magnetic-field-guiding means comprises a magnetically-permeable structure extending circumferentially around the magnetic-field-producing means in close magnetic coupling to the first and second magnetoelastic parts at the respective proximate boundaries of the parts.

The magnetic-field-detecting means is magnetically coupled in a low-reluctance path from the first magnetic-field-guiding means to the second magnetic-field-guiding means for producing a signal representing any torsional stress in the torque-carrying member.

DESCRIPTION OF THE PREFERRED EMBODIMENT

Figure 1A:
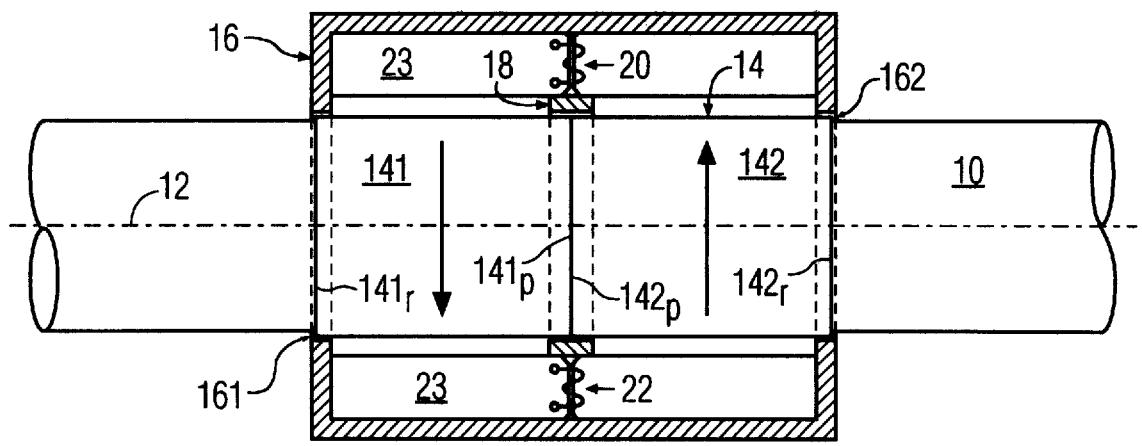
FIGS. 1A and 1B are front views, partly in cross section, of a preferred embodiment of a magnetoelastic torque sensing apparatus in accordance with the invention.

FIG. 1A illustrates a preferred embodiment of a torque sensing apparatus in accordance with the invention. In this exemplary embodiment, the torque-carrying member is in the form of a cylindrical shaft 10 having a torque applied about a central longitudinal axis 12. Preferably, however, the shaft comprises a non-magnetically permeable material, such as a stainless steel or aluminum. The torque sensing apparatus includes a magnetoelastic annulus 14, a magnetic-field-guiding housing 16, a magnetic-field-guiding ring 18, and first and second magnetic field detectors 20 and 22, respectively.

The magnetoelastic annulus 14 includes first and second annular parts 141 and 142 of a magnetically anisotropic material which is intimately bonded to a stress-carrying portion of the shaft 10. Each of these annular parts has an easy axes oriented circumferentially around the longitudinal axis 12. By "intimate bonding" it is meant that the parts are sufficiently closely attached to the shaft 10 to experience torsional stress carried by the shaft. This may be done, for example, by shrink fitting or by plasma spraying a coating of the magnetically anisotropic material onto the shaft. The two parts 141 and 142 of the annulus 14 may be separate annular elements or may be formed as portions of a single continuous element. In either case, these parts are magnetically polarized in opposite circumferential directions around the axis 12, as is indicated by the arrows shown in FIG. 1A. For a more detailed discussion as to suitable anisotropic materials, how such materials may be intimately bonded to a torque-carrying member with a circumferential easy axis, and how the parts may be magnetically polarized in opposite circumferential directions, refer to the U.S. Pat. No. 5,520, 059.

The magnetic-field-guiding housing 16 (shown in cross section) is cylindrically shaped, is formed of a high permeability, magnetically soft material, such as a transformer-grade steel (e.g. the material available from Carpenter Technology Corporation in El Cajon, Calif. under the tradename HyMu "80"), and substantially surrounds the magnetoelastic annulus 14. At opposite ends the housing has openings 161 and 162 defined by respective circular edges of the housing. These circular edges surround, and are closely magnetically coupled to, correspondingly-shaped edges of the magnetoelastic annulus 14 which define remote boundaries $141_r$ and $142_r$ of the annular parts 141 and 142, respectively. These boundaries are remote with respect to boundaries $141_p$ and $142_p$, respectively, which are proximate with respect to each other. In the case where parts 141 and 142 are portions of a single continuous element, the boundaries $141_p$ and $142_p$ are preferably contiguous to simplify construction. Alternatively, these boundaries may be spaced apart to form separate annular parts.

Note that the shapes of the openings 161, 162 and the cross-sectional shapes of the shaft 10 and of the magnetoelastic annulus 14 are circular in this embodiment, to permit free rotation of the shaft within the housing 16. If the torque-sensing apparatus is used to measure static torque, however, any shape may be utilized. In either case, to ensure close magnetic coupling of the housing 16 to the magnetoelastic material, the openings and the respective adjacent circumferential surfaces of the magnetoelastic material should have the same shape and should be as closely spaced as is practical.

The magnetic-field-guiding ring 18 (shown in cross section) is formed of a high permeability, magnetically soft material, such as that used for the housing 16, and extends circumferentially around the magnetoelastic annulus 14. The inner surface of the ring is closely spaced from the outer surface of the magnetoelastic annulus and extends axially across the boundaries $141p$ and $142p$ such that the ring overlies and is closely magnetically coupled to respective boundary regions in the magnetoelastic material.

Figure 2A:
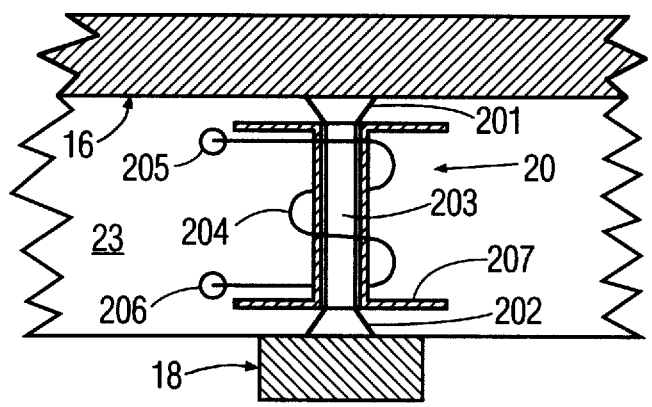
FIGS. 2A and 2B are enlarged front views of exemplary magnetic field detectors that can be utilized in a magnetoelastic torque sensing apparatus in accordance with the invention.

The first and second magnetic field detectors 20 and 22 are magnetically coupled in low-reluctance paths from the magnetic-field-guiding housing 16 to the magnetic-field-guiding ring 18. One of these identical detectors, i.e. detector 20, is shown more clearly in FIG. 2A. This figure is an enlarged view of the detector and of adjacent portions of the magnetic-field-guiding housing 16 and magnetic-field-guiding ring 18. As shown in FIG. 2A, the detector includes first and second conical-shaped flux concentrators 201 and 202, respectively, a cylindrical magnetic core 203, and a coil 204 wound around the core and terminating at first and second electrical terminals 205 and 206, respectively. The coil is wound around a bobbin 207 of a plastic material, such as a thermoset plastic. The low-reluctance path is formed by the flux concentrators and the core, which are in contact with each other and with the housing 16 and ring 18. The flux concentrators are preferably formed as integral parts of the housing 16 and the ring 18. The core is formed of a very high permeability, magnetically soft, high B-H squareness ratio material, such as the amorphous metal fiber available from Unitika, Ltd in Kyoto, Japan under the tradename SENSY.

The detectors 20 and 22 and the ring 18 are held in place by a molded annular positioning member 23 of a plastic material, such as nylon. The detectors may be inserted into preformed cavities (not shown) in the positioning member or, alternatively, the positioning member may be molded around the detectors. The ring 18 is simply slipped into the annular positioning member, which has an inside diameter substantially corresponding to the outside diameter of the ring. To further facilitate assembly, the housing 16 may be formed of two separate parts which have adjoining surfaces lying, for example, along a plane containing the axis 12.

Only one magnetic field detector is needed for effective operation of the torque-sensing apparatus. The shielding provided by the magnetic-field-guiding housing 16 guides much of any external-origin ambient magnetic fields away from the detector. Further, because of the complete circumferential magnetic coupling of the magnetoelastic annulus 14 to the circular edges of the housing 16 and to the ring 18, any localized irregularities in the magnetoelastic material of annulus 14 or the underlying shaft material, causing corresponding localized flux irregularities, have minimal affect on the overall magnitude of flux detected by the magnetic field detector.

By using a plurality of detectors disposed in low-reluctance paths between the housing 16 and ring 18 at different angular positions around the axis 12, effectiveness of the torque-sensing apparatus is even further improved. This is especially true if one or more equiangularly-spaced pairs of detectors are utilized, with the detectors in each pair being arranged on diametrically opposite sides of the axis 12. With such an arrangement, external-origin ambient magnetic fields tend to oppose the torque-indicating magnetic field from the magnetoelastic annulus at one detector in a pair, while aiding that at the opposite detector in the pair. This enables signals from the two detectors in a pair to be combined such that they can be canceled.

Figure 1B:
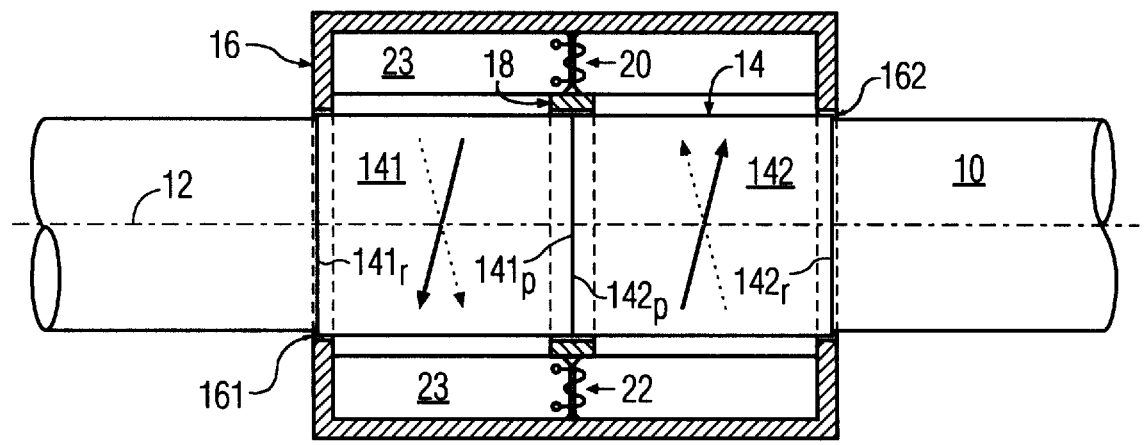

Operation of the torque-sensing apparatus of FIG. 1A can be better understood by referring to FIGS. 1A and 1B together. FIG. 1A illustrates the situation that exists when no torque is applied to the shaft 10. In this situation, the magnetoelastic annulus 14 is in a state of equilibrium and the polarized magnetic fields in the first and second parts 141 and 142 are oriented circumferentially, but oppositely, around the longitudinal axis 12 in the directions indicated by the respective arrows.

FIG. 1B illustrates two different situations that may exist when torque is applied to the shaft 10 around the axis 12, thus applying torsional stress to the magnetoelastic annulus 14. If torque is applied in a clockwise direction, to either end of the shaft, the resulting stress in the first and second parts 141 and 142 causes the respective polarized magnetic fields to become oriented helically in the directions indicated by the solid-line arrows. Each of these magnetic fields has an axial component which is directed from the respective one of the proximate boundaries $141_p$ & $142_p$ to the respective one of the remote boundaries $141_r$ & $142_r$. These axial components are coupled out of the annulus 14 at the remote boundaries, through the housing 16, radially-inwardly through detectors 20 and 22, and are coupled back into the annulus at the proximate boundaries by the ring 18. Conversely, if torque is applied in a counter-clockwise direction, to either end of the shaft, the resulting stress in the first and second parts 141 and 142 causes the respective polarized magnetic fields to become oriented helically in the directions indicated by the broken-line arrows. Each of these magnetic fields has an axial component which is directed from the respective one of the remote boundaries $141_r$ & $142_r$, to the respective one of the proximate boundaries $141_p$ & $142_p$. These axial components are coupled out of the annulus 14 at the proximate boundaries, through the ring 18, radially-outwardly through detectors 20 and 22, and are coupled back into the annulus at the remote boundaries by the housing 16.

Note that the coil-type of detectors 20 and 22 shown in FIGS. 1A and 1B cannot passively detect axial field components passing through them from the magnetoelastic annulus 14. However, these field components can be detected by actively energizing the coils in accordance with well known techniques such as those utilized in flux-gate magnetometers. This can be done, for example, by passing an alternating-current signal through the coils. The instantaneous axial field component from the magnetoelastic annulus 14 alternately aids and opposes the field produced by the coils and can be detected as a phase shift of the applied alternating-current signal.

Figure 2B:
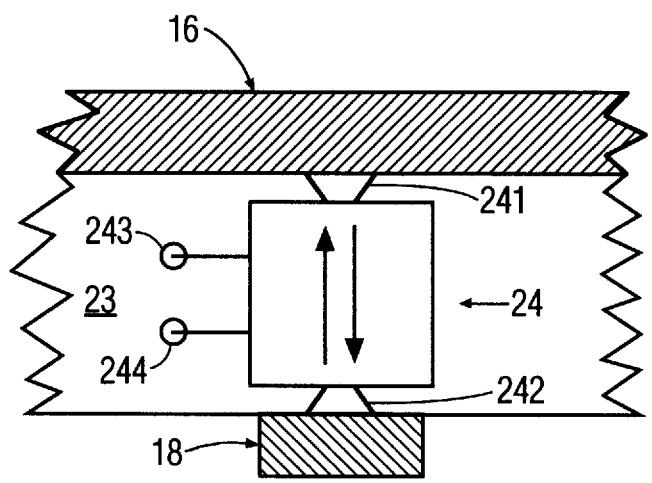

FIG. 2B shows the use of a semiconductor detector in place of the coil-type of detector to passively measure the direction and magnitude of the axial magnetic-field component in the magnetoelastic annulus 14. Preferably this detector 24 is a Hall-Effect device or a Giant Magneto-Resistive device, either of which is capable of detecting a magnetic field in either direction along a predefined magnetic path in the device. This path is aligned between conical-shaped flux concentrators 241 and 242, as shown in FIG. 2B. The device produces a varying DC signal at electrical terminals 243 and 244, which represents the instantaneous direction and magnitude of the torsional stress being experienced by the magnetoelastic annulus 14.

We claim:

1. A torque-sensing apparatus for indicating torsional stress about a longitudinal axis of a torque-carrying member, said apparatus comprising:
   a. magnetic-field-producing means including magnetoelastic first and second parts which are intimately bonded to respective portions of the torque-carrying member, each of said first and second magnetoelastic parts extending circumferentially around the axis from a respective proximate boundary that is closer to the other magnetoelastic part to a respective remote boundary that is farther from the other magnetoelastic part, said first and second magnetoelastic parts being magnetically polarized in opposite first and second circumferential directions, respectively, but when said torque-carrying member experiences torsional stress producing respective, oppositely-directed, axial magnetic field components representing the direction and magnitude of said torsional stress;
   b. first magnetic-field-guiding means comprising a magnetically-permeable housing extending circumferentially around the magnetic-field-producing means from a first portion of the housing, that is closely magnetically coupled to the first magnetoelastic part at the respective remote boundary, to a second portion of said housing, that is closely magnetically coupled to the second part of the magnetoelastic means at the respective remote boundary;
   c. second magnetic-field-guiding means comprising a magnetically-permeable structure disposed within the housing and extending circumferentially around the magnetic-field-producing means in close magnetic coupling to the first and second magnetoelastic parts at the respective proximate boundaries of said parts; and
   d. magnetic-field-detecting means magnetically coupled in a low-reluctance path from the first magnetic-field-guiding means to the second magnetic-field-guiding means for producing a signal representing said torsional stress.

2. A torque-sensing apparatus for indicating torsional stress about a longitudinal axis of a torque-carrying member, said apparatus comprising:
   a. magnetoelastic means including first and second parts which are intimately bonded to respective portions of the torque-carrying member, each of said first and second parts extending circumferentially around the longitudinal axis from a respective proximate boundary that is closer to the other part to a respective remote boundary that is farther from the other part and comprising a magnetically anisotropic material having a easy axis which is circumferentially-oriented around said longitudinal axis;
      i. said first part being magnetically polarized in a first circumferential direction around the longitudinal axis; and
      ii. said second part being magnetically polarized in an opposite second circumferential direction around said longitudinal axis;
   b. first magnetic-field-guiding means comprising a magnetically-permeable housing extending circumferentially around the magnetoelastic means from a first portion of the housing, that is closely magnetically coupled to the first part of the magnetoelastic means at the respective remote boundary, to a second portion of the housing, that is closely magnetically coupled to the second part of the magnetoelastic means at the respective remote boundary;
   c. second magnetic-field-guiding means comprising a magnetically-permeable structure disposed within the housing and extending circumferentially around the magnetic-field-producing means in close magnetic coupling to the first and second magnetoelastic parts at the respective proximate boundaries of said parts; and
   d. magnetic-field-detecting means magnetically coupled in a low-reluctance path from the first magnetic-field-guiding means to the second magnetic-field-guiding means for producing a signal representing said torsional stress.

3. A torque-sensing apparatus for indicating torsional stress about a longitudinal axis of a torque-carrying member, said apparatus comprising:
   a. a magnetoelastic annulus including first and second parts which are intimately bonded to respective portions of the torque-carrying member, each of said first and second parts extending circumferentially around the longitudinal axis from a respective proximate boundary that is closer to the other part to a respective remote boundary that is farther from the other part and comprising a magnetically anisotropic material having a easy axis which is circumferentially-oriented around said longitudinal axis;

i. said first part being magnetically polarized in a first circumferential direction around the longitudinal axis; and ii. said second part being magnetically polarized in an opposite second circumferential direction around said longitudinal axis;

b. first magnetic-field-guiding means comprising a substantially cylindrical magnetically-permeable housing extending circumferentially around the magnetoelastic annulus from a first portion of the housing, that is closely magnetically coupled to the first part of the magnetoelastic annulus at the respective remote boundary, to a second portion of the housing, that is closely magnetically coupled to the second part of the magnetoelastic annulus at the respective remote boundary;

c. second magnetic-field-guiding means comprising a magnetically-permeable ring disposed within the housing and extending circumferentially around the magnetoelastic annulus in close magnetic coupling to the first and second parts at the respective proximate boundaries of said parts; and d. first and second magnetic-field detectors magnetically coupled in a low-reluctance path from the first magnetic-field-guiding means to the second magnetic-field-guiding means for producing a signal representing the magnitude and direction of said torsional stress.

4. A torque-sensing apparatus for indicating torsional stress about a longitudinal axis of a torque-carrying member, said apparatus comprising:

a. magnetic-field-producing means including magnetoelastic first and second parts which are intimately bonded to respective portions of the torque-carrying member, each of said first and second magnetoelastic parts extending circumferentially around the axis from a respective proximate boundary that is closer to the other magnetoelastic part to a respective remote boundary that is farther from the other magnetoelastic part, said first and second magnetoelastic parts having a first state when said torque-carrying member does not experience torsional stress and having a second state when said torque-carrying member does experience torsional stress, in said first state, said first and second magnetoelastic parts being magnetically polarized in respective, opposite first and second circumferential directions, in said second state, said first and second magnetoelastic parts producing respective, oppositely-directed, axial magnetic field components representing the direction and magnitude of said torsional stress;

b. first magnetic-field-guiding means comprising a magnetically-permeable housing extending circumferentially around the magnetic-field-producing means from a first portion of the housing, that is closely magnetically coupled to the first magnetoelastic part at the respective remote boundary, to a second portion of said housing, that is closely magnetically coupled to the second part of the magnetoelastic means at the respective remote boundary;

c. second magnetic-field-guiding means comprising a magnetically-permeable structure extending circumferentially around the magnetic-field-producing means in close magnetic coupling to the first and second magnetoelastic parts at the respective proximate boundaries of said parts; and d. magnetic-field-detecting means magnetically coupled in a low-reluctance path from the first magnetic-field-guiding means to the second magnetic-field-guiding means for producing a signal representing said torsional stress.

5. A torque-sensing apparatus as in claim 1, 2, or 4 where the first and second parts are integrally attached to the torque-carrying member.

6. A torque-sensing apparatus as in claim 1, 2, or 4 where the magnetic-field-detecting means comprise first and second magnetic field detectors that are magnetically coupled in respective low-reluctance paths from the first magnetic-field-guiding means to the second magnetic-field-guiding means.

7. A torque-sensing apparatus as in claim 6 where the first and second magnetic field detectors are disposed at diametrically-opposite positions with respect to the longitudinal axis.

8. A torque-sensing apparatus as in claim 3 where the first and second parts are integrally attached to the torque-carrying member.

9. A torque-sensing apparatus as in claim 3 where the first and second magnetic field detectors are disposed at diametrically-opposite positions with respect to the longitudinal axis.

* * * * *